Dec. 29, 1959 — R. W. SEARLE — 2,918,952
LOG DEBARKING MACHINE HAVING UNIVERSALLY MOUNTED AND INWARDLY BIASED CUTTERS
Filed June 9, 1958 — 6 Sheets-Sheet 1

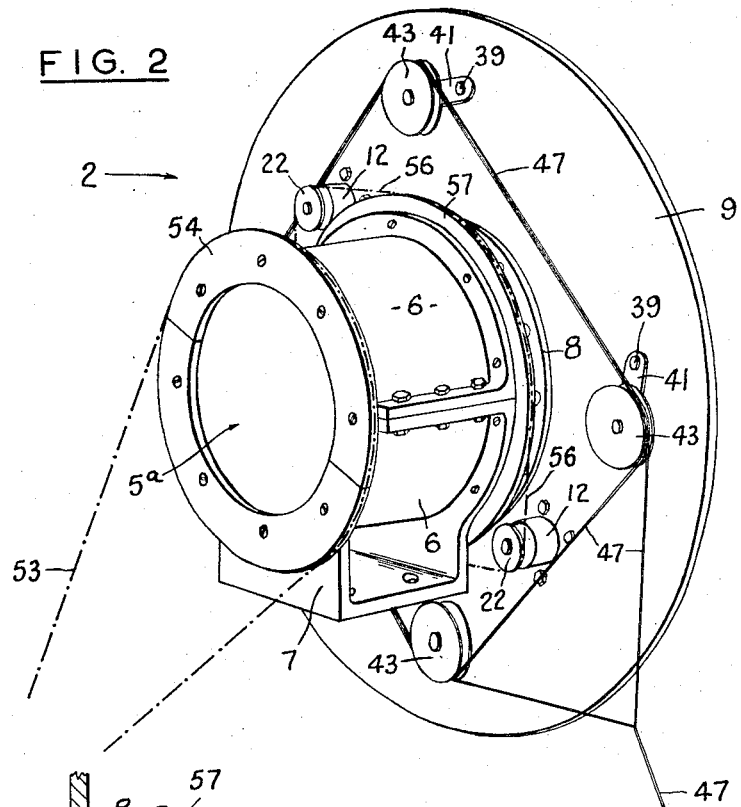
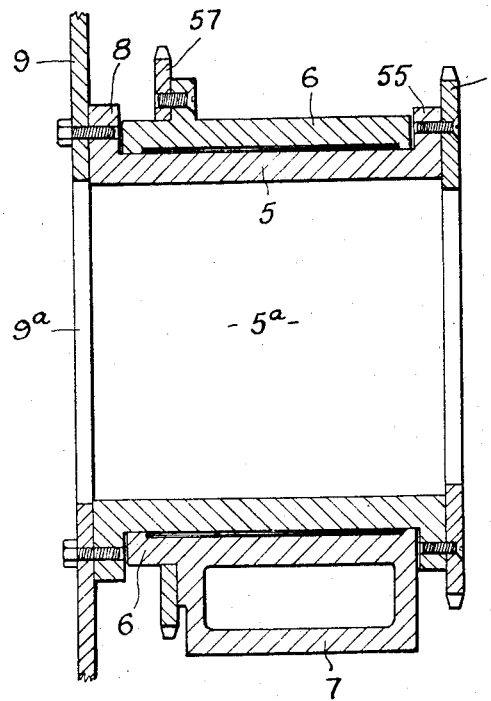
FIG. 2
FIG. 3

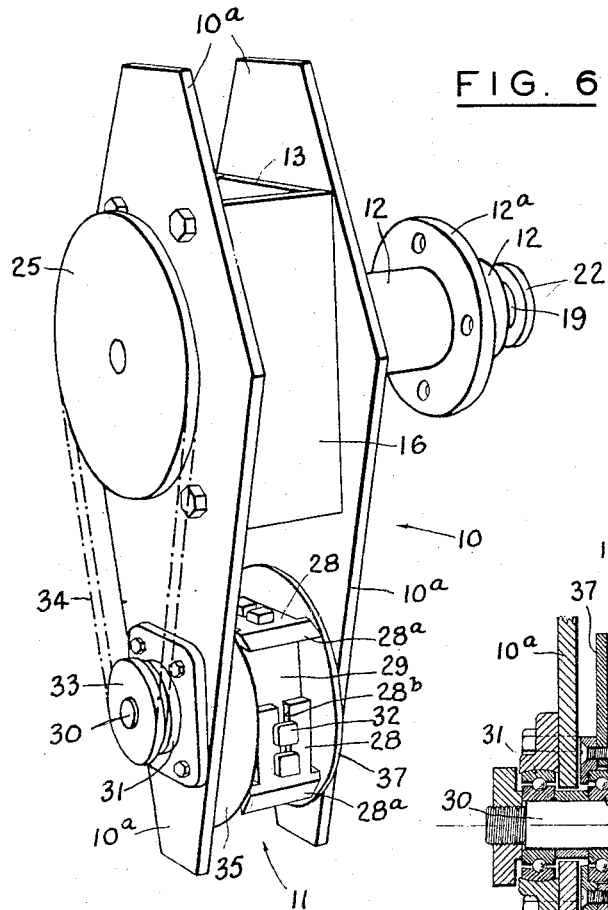
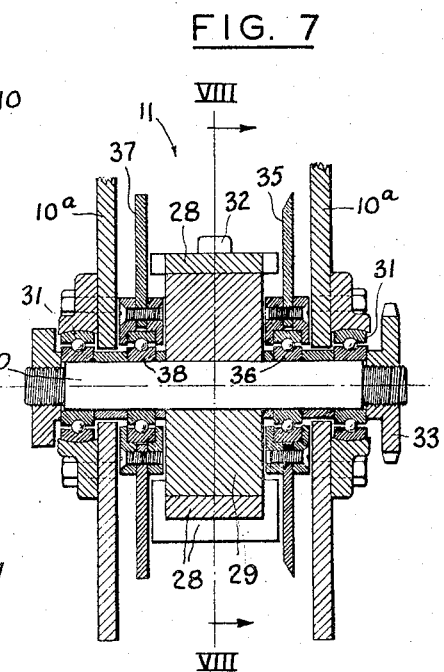
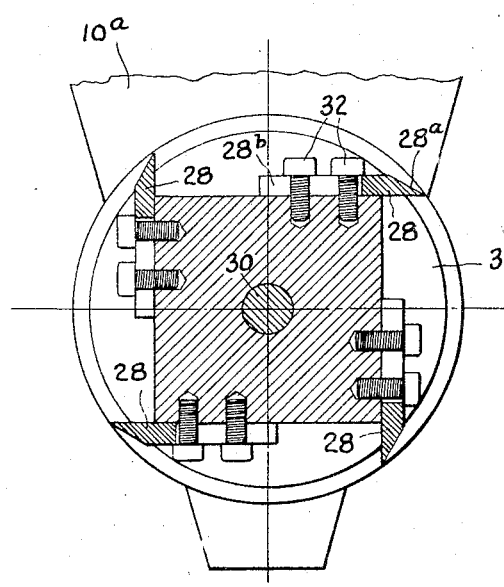

Dec. 29, 1959   R. W. SEARLE   2,918,952
LOG DEBARKING MACHINE HAVING UNIVERSALLY
MOUNTED AND INWARDLY BIASED CUTTERS
Filed June 9, 1958   6 Sheets-Sheet 6

United States Patent Office 2,918,952
Patented Dec. 29, 1959

2,918,952
LOG DEBARKING MACHINE HAVING UNIVERSALLY MOUNTED AND INWARDLY BIASED CUTTERS
Ronald W. Searle, Dallington, Christchurch, New Zealand
Application June 9, 1958, Serial No. 740,868
Claims priority, application New Zealand June 7, 1957
1 Claim. (Cl. 144—208)

The invention relates to log-barking machines, and has as its general object the provision of a log-barking machine which enables bark to be cut from logs of varying diameters in a neat and even manner, so as to render the logs suitable for use as fence posts, telegraph poles, and the like, or for pulping in the manufacture of paper or the like.

A further object of the invention is the provision of a log-barking machine which is self-adjusting during its operation so as to conform to varying diameters or superficial irregularities of a log or of successive logs passing through the machine, without the need for manual adjustment of the machine for this purpose.

A particular and additional object of the invention, in one of its embodiments, is the provision of a log-barking machine having means for varying the depth of cut of the machine in logs of similar hardness, or for maintaining a substantially even depth of cut in logs of different hardnesses, such means being adjustable by an operator according to the depth of cut required and the hardness of the log to be barked.

Other objects and advantages of the invention will be apparent from the following description.

The log-barking machine of the invention consists basically of a rotatable cutting head through which a log can be moved; feed means operable to move and guide a log through the head; a framework supporting the head and the feed means; cutting means which form a part of the cutting head and which are operable to cut and remove the bark from a log while the log is moved through the head, the cutting means being influenced and arranged so as to bear resiliently and uninterruptedly against the log during the cutting of the bark from the log; and depth-regulating means associated with the cutting means and adapted and arranged to govern the depth of the cut made by the cutting means in accordance with the thickness of bark on the log.

Pressure-regulating means may be provided for varying the pressure with which the cutting means bear on the logs passing through the machine, so as to vary the depth of cut into the wood of the logs, or to provide for a substantially even depth of cut into the wood of logs of different hardnesses.

The depth-regulating means may consist, for example, of a colter or spiked wheel arranged to follow the contour of the log and to penetrate the bark and ride on the wood beneath the bark during the cutting operation.

A motor or motors drivably connected to the feed means and to the cutting head and its cutting means may be mounted on the framework of the machine.

By way of example of how the invention can be carried into effect, one embodiment of the invention will now be described in detail with reference to the accompanying drawings of the log-barking machine constituting the said embodiment.

In the drawings:

Figure 2 is a rear angular perspective view of a cutting head forming part of the machine;

Figure 3 is a vertical axial section of part of the cutting head;

Figure 6 is a front angular perspective view of cutting means forming a part of the cutting head;

Figure 7 is a vertical axial section of the lower part of the cutting means shown in Figure 6;

Figure 8 is a vertical section of the same part of the cutting means, taken on the line VIII—VIII of Figure 7 and looking in the direction of the arrows from that line;

Figure 1:
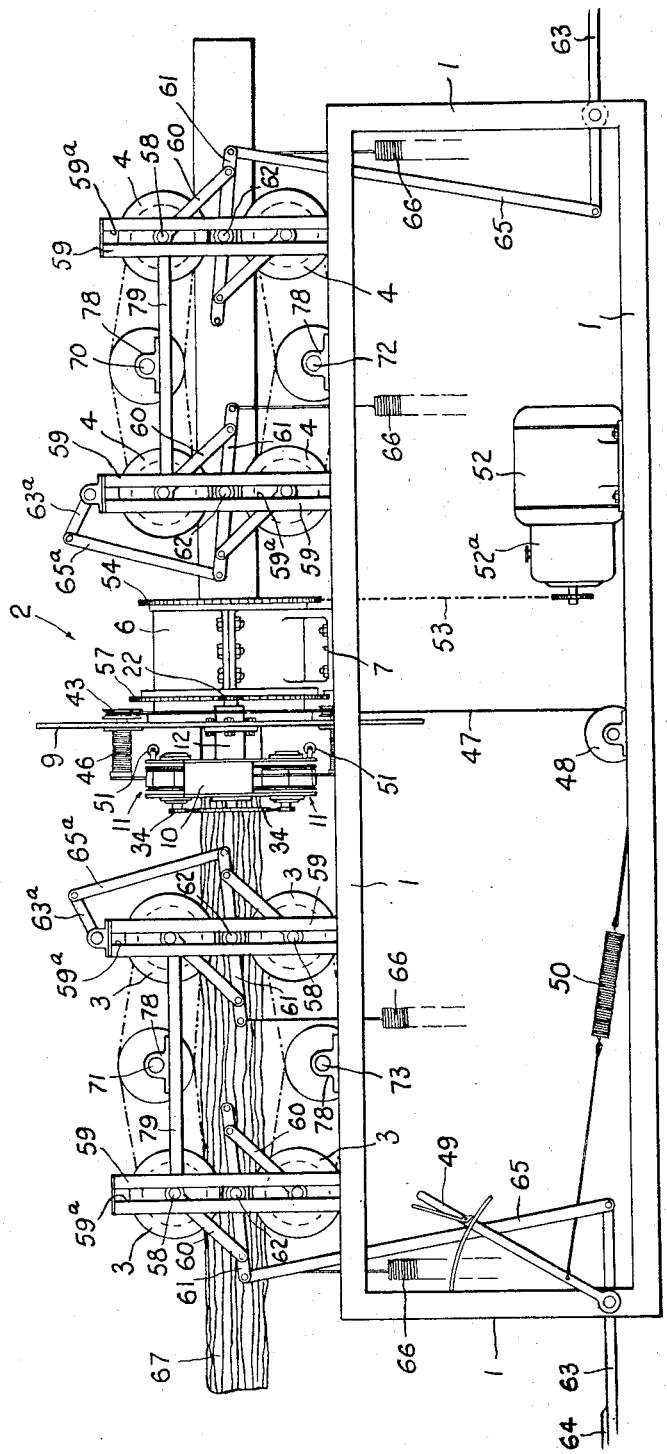
Figure 1 is a general side elevational view of the machine, showing a log passing through the machine.

The machine shown in the drawings has, as shown generally in Figure 1, an elongated framework 1 of welded metal construction, the framework supporting a rotatable cutting head 2 mounted transversely and more or less centrally of the framework, and feed means consisting of four pairs of feed rollers 3, 4 mounted two pairs on each side of the cutting head 2, between the cutting head and the ends of the framework 1.

The framework 1 consists of two elongated rectangular side frames (only one of which is visible in Figure 1) arranged parallely and vertically on one longer side and joined by a suitable number of cross pieces (not visible in Figure 1) which extend between and are welded at their ends to the side frames at opposed points thereon.

The cutting head 2, as shown in more detail in Figures 2 and 3, has a sleeve 5 which is rotatably supported in a horizontally extending split cylindrical bearing 6, a lower shell of which is formed with a bracket portion 7 which is bolted to the upper central part of the framework 1 so that the bore 5a of the sleeve 5 extends horizontally and lengthwise of the framework 1. The bore 5a of the sleeve is of a sufficient diameter to allow of the passage of logs through the bore when the machine is in operation, the exact diameter of the bore 5a being of course determined by the maximum diameter of logs which the machine is constructed and intended to handle. The sleeve 5, as shown particularly in Figure 3, is formed at one end with a peripheral flange 8, to which is bolted an annular plate 9 having a central hole 9a which is equal in diameter to the bore 5a of the sleeve 5, and is in axial alignment with the bore 5a when the plate 9 is bolted to the end flange 8 of the sleeve 5.

Figure 4:
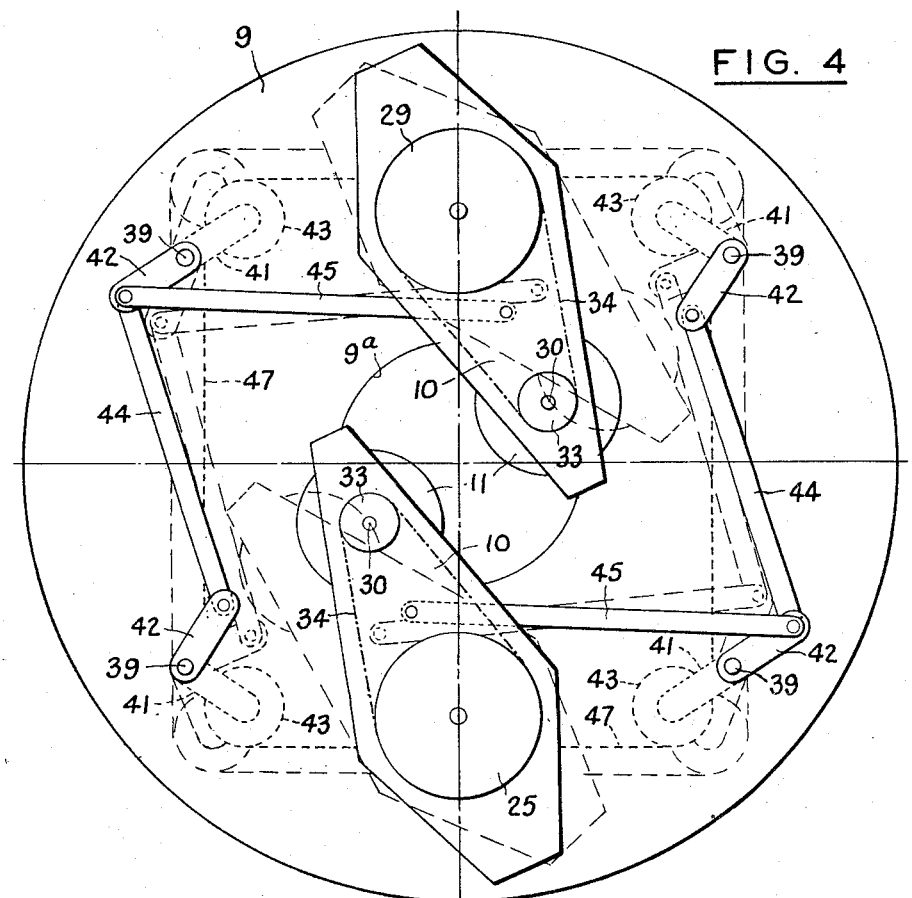
Figure 4 is a front elevation of the cutting head, showing in light broken outline different positions of parts of the head.
Figure 5:
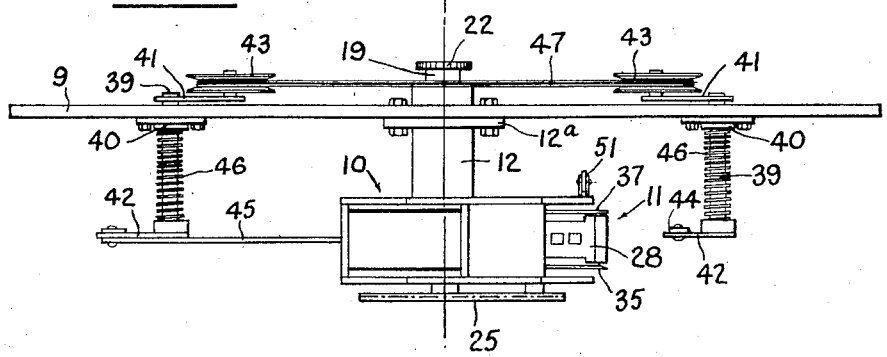
Figure 5 is a plan of part of the cutting head, as projected from Figure 4.
Figure 9:
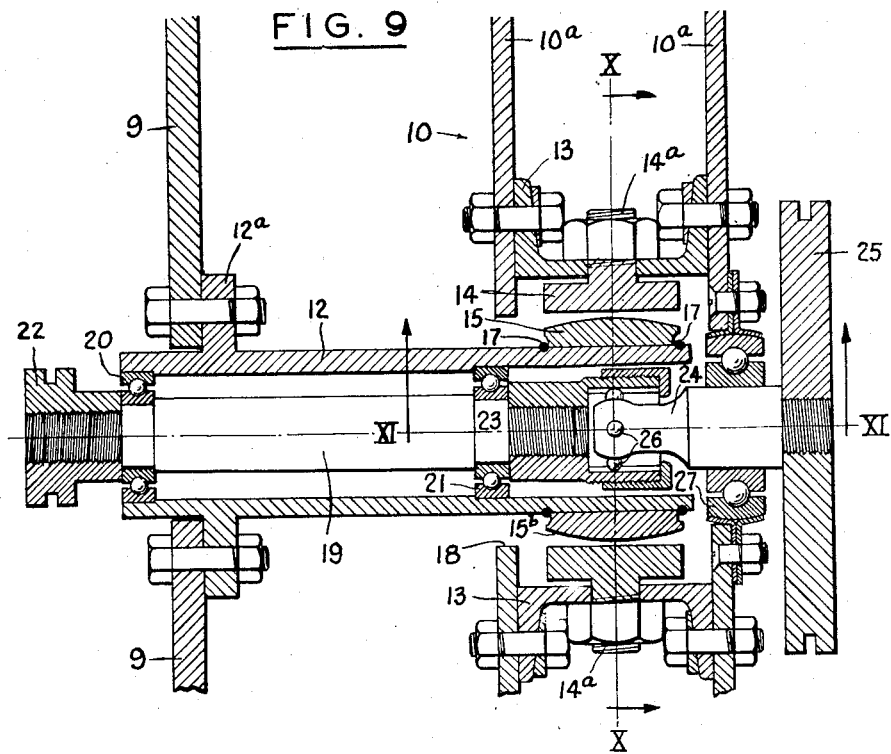
Figure 9 is a vertical axial section of the upper part of the cutting means shown in Figure 6.
Figure 10:
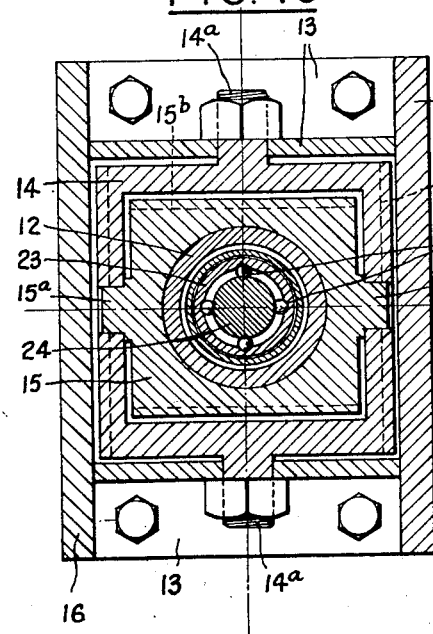
Figure 10 is a vertical section of the part shown in Figure 9, taken on the line X—X of Figure 9 and looking in the direction of the arrows from that line.

The cutting head 2, as shown in Figures 4 and 5, also includes cutting means consisting of a pair of cutter arms 10 (one of which is shown by itself in Figure 6) each provided near one end with a rotatable cutter 11, the arms 10 being universally mounted near their other ends one on each of a pair of tubular housings 12 which are secured to the annular plate 9 at diametrically opposite points thereon, and which extend through the plate 9 at right angles thereto. As shown particularly in Figure 9, each housing 12 is formed near one end with an annular external flange 12a which is bolted to one face of the plate 9 around a hole therein through which the adjacent end portion of the housing 12 projects. Each cutter arm 10 consists of a pair of side plates 10a secured together in spaced and parallel relationship by being bolted to a pair of intervening channel-section spacers 13 arranged horizontally one above the other and facing away from each other, as shown in Figures 9 and 10.

Figure 11:
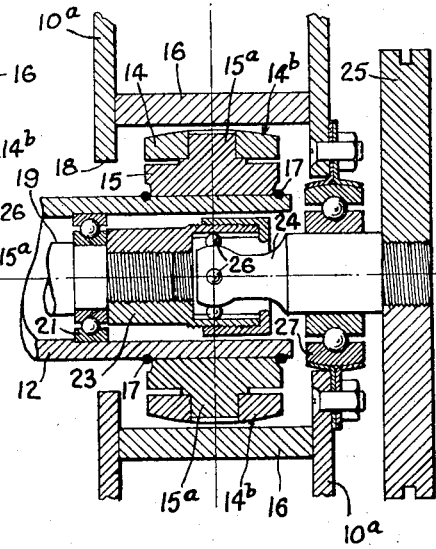
Figure 11 is an inverted sectional plan of the part shown in Figure 9, taken on the line XI—XI of Figure 9 and looking in the direction of the arrows from that line.

The universal mounting of the cutter arms 10 on the housings 12 is effected in the case of each cutter arm 10 by means of a universal joint 14, 15 (see Figures 9, 10 and 11) mounted between the spacers 13 of the cutter arm. The universal joint has an outer member 14 and an inner member 15, the outer member 14 being of hollow square section and being turnably supported on a vertical axis provided by a pair of trunnion pins 14a of the member 14 which are engaged in vertically aligned bearing holes in the spacers 13, while the inner member 15 consists of a square block turnably supported on a horizontal axis provided by a pair of trunnion pins 15a of the member 15 which are engaged in horizontally aligned bearing holes in opposite sides of the outer member 14, as all shown most clearly in Figure 10. The sides of the members 14 and 15 other than those on which the trunnion pins 14a and 15a are provided are rounded to provide convex outer surfaces 14b and 15b respectively, the rounding of these surfaces affording the necessary clearances between the outer member 14 and a pair of vertical side cover plates 16 welded across the ends of the spacers 13 to cover the universal joint, and between the inner member 15 and the outer member 14, so as to enable a limited pivotal movement of the cutter arm 10 on the axis of the trunnions 14a and a similar movement of the cutter member 14 on the trunnions 15a. The inner member 15 of the universal joint is formed with a bore enabling the member 15 to be rotatably mounted on the end portion of the corresponding housing 12 remote from the annular plate 9, the member 15 being held against sliding movement lengthwise of the housing 12 by means of a pair of circlips 17 (see Figures 9 and 11). To enable the mounting of the member 15, and thereby of the cutter arm 10, on the housing 12 and to allow for the required universal movement of the cutter arm 10 in relation to the housing 12, a hole 18 is provided in one of the slide plates 10a of the cutter arm 10, as shown in Figures 9 and 11. In normal use of the machine, this hole is sealed against entry of dust and chips by means of a flexible seal between the portion of the plate 10a around the hole 18 and the adjacent portion of the housing 12, the seal being omitted in the drawings for the sake of clarity.

The housing 12 on which each cutter arm 10 is mounted contains a drive shaft 19 which extends co-axially with the housing and is rotatably supported in bearings 20, 21 within the housing. One end of the drive shaft 19 projects beyond the end of the housing 12 remote from the cutter arm 10, and is fitted with a sprocket 22 through which the shaft 19 is driven in a manner which will be hereinafter described, while the other end of the shaft 19 is connected through a universal joint 23, 24 to a drive sprocket 25 for transmission of power from the shaft 19 to the rotatable cutter 11 of the corresponding cutter arm 10, as will also be hereinafter described. The universal joint 23, 24 consists of an external member 23 which is fixed on the end of the shaft 19 and is formed with an internally and longitudinally grooved socket in which is housed one end of an internal member 24 of the joint, a universal driving connection between the two members being provided by a number of balls 26 rotatably accommodated in part-spherical depressions of the internal member 24 and rotatably and slidably accommodated in the grooves of the external member 23. The internal member 24 is rotatably supported, at an axial extension of that member, within a bearing 27 in the side plate 10a of the cutter arm 10 opposite the hole 18, the extension projecting through the bearing 27 and said plate 10a and carrying the drive sprocket 25 on its projecting portion.

As shown in Figures 6, 7 and 8, the rotatable cutter 11 of each cutter arm 10 consists of a set of four planing knives 28 secured to a square hub 29 which is fixed on an axle (hereinafter referred to as the cutter shaft) 30 rotatably supported in bearings 31 of the side plates 10a, the knives 28 being disposed around the hub 29 in the arrangement shown in Figure 8, and being adjustable in relation to the hub 29 in the direction of their length to enable the knives to be maintained at a desired projection from the hub despite wear at the cutting edges 28a of the knives. To enable such adjustment, the knives 28 are secured to the hub 29 by screws 32 which are fitted through longitudinal slots 28b of the knives 28, the screws 32 being slackened when adjustment of the knives is necessary. A sprocket 33 is fixed on one end of the cutter shaft 30 which projects through and beyond its bearing 31, the sprocket 33 being connected by a chain drive 34 (Figure 6) to the drive sprocket 25 on the internal member 24 of the universal joint 23, 24 of that cutter arm, so that the cutter 11 is rotated upon rotation of the corresponding drive shaft 19. In practice, a suitable cover is provided over the sprockets 25 and 33 and the chain drive 34 to exclude dust and chips, but in the drawings this cover is omitted for the sake of clarity.

A colter 35 is freely mounted on a bearing 36 on the cutter shaft 30 of each cutter arm 10, between one end of the hub 29 and the adjacent cutter shaft bearing 31, the diameter of the colter 35 being approximately equal to the diameter of the circle in which the cutting edges 28a of the planing knives 28 move during rotation of the cutter 11. A blunt edged metal disc 37 of the same diameter as the colter 35 is also freely mounted on a bearing 38 on each cutter shaft 30 between the other end of the hub 29 and the other cutter shaft bearing 31.

Four spindles 39 are rotatably supported in bearings 40 arranged on the annular plate 9 at the four corners of an imaginary square, the center of which coincides with the axis of rotation of the cutting head. The spindles 39 extend through the plate 9 at right angles thereto, the greater part of the length of each spindle lying on the same side of the plate 9 as the cutter arms 10. A pair of oppositely directed cranks 41, 42 are fixed on the end portions of each spindle 39 to project from the spindle at right angles thereto, the cranks 41, on the side of the plate 9 opposite the cutter arms 10, carrying four free-running pulleys 43 disposed parallelly to the plate 9, while the cranks 42, on the other side of the plate 9, are connected on two sides of the said square by links 44. Two diagonally opposite ones of the cranks 42 are connected by links 45 one to each of the cutter arms 10, as shown particularly in Figure 4, and the spindles 39 are influenced in a counterclockwise direction, as seen from the ends of the spindles carrying the cranks 42, by means of four torsion springs 46 fitted one on each of the spindles 39 and acting between the bearings 40 and the cranks 42, the influence of the torsion springs 46 tending to move the free ends of the cutter arms 10, carrying the cutters 11, away from each other and from the axis of rotation of the cutting head 2.

The pulleys 43 are connected by a loop of a cable 47 which is passed twice around the four pulleys, the cable passing around a guide pulley 48 mounted on the framework 1 (see Figure 1) and being connected to a tension-regulating lever 49 through the intermediary of a tension coil spring 50, as also shown in Figure 1. The tension of the spring 50, applied to the spindles 39 through the cable 47, pulleys 43 and cranks 41, acts in the opposite direction to the torsion springs 46 and is normally applied through the lever 49 to an extent sufficient to overcome the influence of the torsion springs and influence the spindles in a clockwise direction, as seen from the ends of the spindles carrying the cranks 42, so that the free ends of the cutter arms 10 are moved towards each other from opposite sides of the axis of rotation of the cutting head 2. The torsion springs only act to move the said ends of the cutting arms 10 away from the said axis when the tension of the spring 50 is released or so reduced by operation of the lever 49 that it no longer suffices to overcome the influence of the torsion springs 46.

A small guide wheel 51 (see Figures 1 and 5), which is mounted on the free end portion of each cutter arm 10 and projects therefrom towards the plate 9, limits the extent of movement of the corresponding cutter arm 10 towards the plate 9 and acts as a thrust bearing at the commencement of rotation of the cutting head 2.

Power for rotation of the cutting head 2 is supplied from an electric motor 52, shown in Figure 1, which is mounted on the framework 1 of the machine and is drivably connected to the sleeve 5 of the head 2 through a reduction gear box 52a of the motor 52 and through a chain 53 passing around a ring sprocket 54 secured to an end flange 55 of the sleeve 5 opposite the flange 8, as shown particularly in Figures 2 and 3. Rotation of the cutters 11 as the head 2 is rotated is effected through the sprockets 22 fixed on the ends of the drive shafts 19, the sprockets 22 meshing with a chain 56 passing loosely around and in mesh with a relatively large stationary ring sprocket 57 which is fixed on the bearing 6 of the sleeve 5, as shown in Figures 2 and 3, the sprockets 22 and the chain 56 forming in effect a planetary gearing whereby the cutters 11 are rotated at a speed considerably in excess of the speed of rotation of the cutting head 2 as a whole.

Logs to be barked are fed through the bore of the cutting head 2 by the feed rollers 3, 4, the rollers of each pair being fixedly mounted on a pair of parallel and vertically spaced cross shafts 58, and the ends of each pair of shafts being slidably engaged in vertical longitudinal slots 59a of a pair of vertical guide members 59 welded at their lower ends to the upper longitudinal members of the framework 1 on opposite sides of the framework. The shafts 58 of each pair are linked by pivoted connecting rods 60 to opposite ends of a pair of levers 61 which are pivoted at their centres on a pair of fixed pivot bolts 61 secured to the adjacent guide members 59, so that the shafts 58 and their rollers 3, 4 are movable equidistantly above and below a fixed horizontal plane, being the plane of the pivot bolts 62. The shafts 58 and the rollers 3, 4 are so arranged that the said plane is also the horizontal axial plane of the bore of the cutting head 2, and to prevent tilting of the shafts 58 in relation to this plane one end of each lever 61 is pivotally linked to a stabilizing member pivoted to a fixed part of the machine. In the case of the shafts 58 at each end of the machine, the stabilizing members consist of pivoted foot levers each comprising a pair of parallel lever members 63 fixedly connected at one end by a transverse foot bar 64, and pivoted intermediately of their ends to the upright end members of the corresponding end of the framework 1, the other ends of the lever members 63 being pivotally linked by a pair of link bars 65 to the appropriate end of the corresponding levers 61. In the case of the two intermediate pairs of shafts 58, the stabilizing members consist of two pairs of levers 63a pivoted to the upper ends of the two corresponding pairs of guide members 59, and pivotally linked by link bars 65a to the appropriate ends of the corresponding levers 61.

Figure 13:
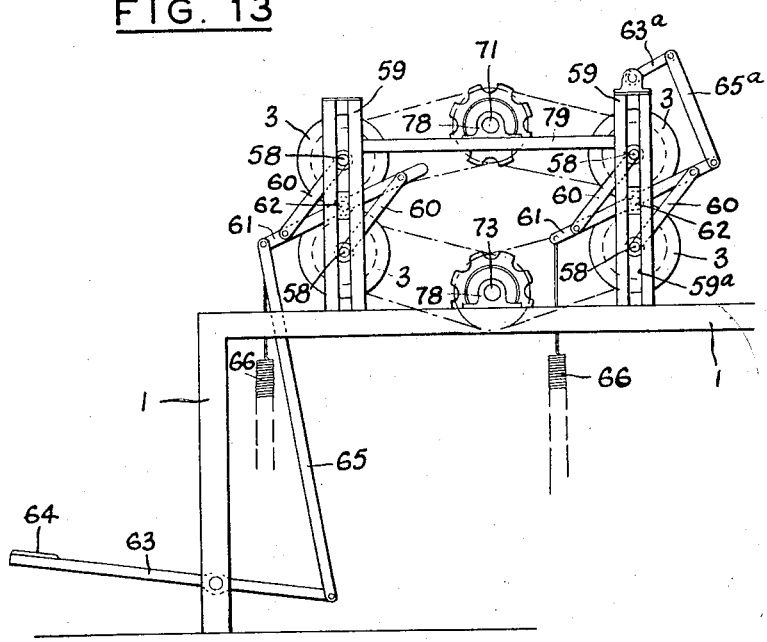
Figure 13 is a side elevation of part of the machine, showing the position of part of the feed means and associated linkage prior to the introduction of a log into the machine.

The levers 61 are influenced by tension springs 66 secured between one end of each lever 61 and a fixed part of the framework 1, the influence of the springs being so applied to the levers 61 as to normally hold the rollers of each pair together, in the position shown in Figure 13. The linking of the foot levers to the levers 61 of the end pairs of rollers is such that the rollers of each end pair can be moved apart against the influence of the corresponding springs 66 so as to allow of the introduction or removal of a log 67, shown in Figure 1, into or from the machine.

Figure 12:
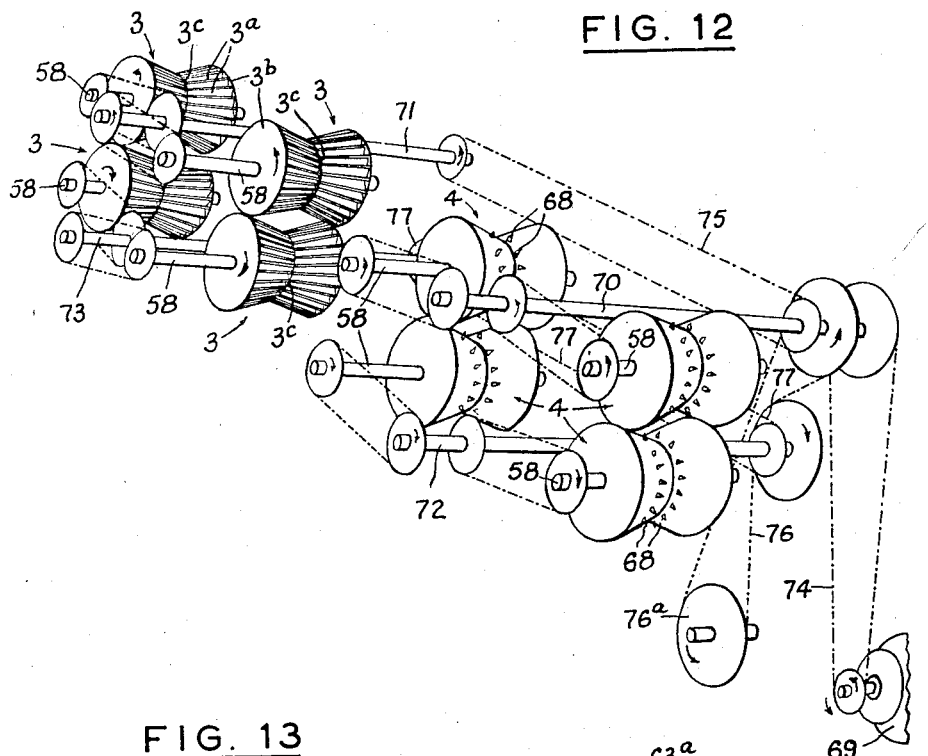
Figure 12 is a schematic perspective view of feed means and associated drive-transmission means which form part of the machine.

As is shown in Figure 12, the rollers 3, at the forward end of the machine, each consist of a series of oppositely inclined metal fins 3a welded at their ends to the outer edge portions of a pair of metal end discs 3b and a central disc 3c of smaller diameter than the end discs, so that the outer peripheral surface of each roller is in effect tapered from each end of the roller to the central portion of the roller. The rollers 4 are of similar peripheral shape but are of solid construction, and are provided with a plurality of spikes 68 near the narrow central waist of each roller. The rollers 3, 4 are so arranged on their shafts 58 that the central discs 3c of the rollers 3 and the corresponding central waists of the rollers 4 all lie in the same vertical plane, which is also the vertical axial plane of the bore of the cutting head 2. Thus logs fed through the machine by the rollers are at all times centred in axial alignment with the bore of the cutting head, so far as this is possible having regard to the shape of the log.

Both rollers of each pair are drivably connected through driving means associated with their shafts 58, and through reduction gearing, to a common source of power at a second electric motor 69 which is mounted on the framework 1 of the machine. Thus, once a log introduced into the machine has entered between the rollers, it is fed by the rollers 3 into and through the bore of the cutting head 2 and is carried clear of the machine by the rollers 4, on the other side of the head 2. The tension springs 66 cause the rollers 3, 4 to bear together on the logs passing between them under a pressure sufficient to ensure that slippage of the rollers on the logs is normally avoided, so that the logs are moved steadily through the cutting head.

The driving means associated with the shafts 58 for the transmission of power from the motor 69 are shown most clearly in Figure 12. As will be seen from that figure, the driving means include a main drive shaft 70, an auxiliary drive shaft 71, a countershaft 72 and an auxiliary countershaft 73. The main drive shaft 70 is driven by a chain and sprocket drive 74 from the motor 69, and in turn drives the auxiliary drive shaft 71 through a chain and sprocket drive 75, and drives the countershaft 72 through a reversing chain and sprocket drive 76 passing around an idler sprocket 76a. The auxiliary countershaft 73 is driven by a chain and sprocket drive 77 from the countershaft 72, the shafts 70, 71, 72 and 73 being rotatably supported at their ends in bearings 78, shown in Figure 1, of which the bearings of the shafts 70 and 71 are mounted on supporting bars 79 extending between and secured to adjacent pairs of the guide members 59 on each side of the framework 1, while the bearings of the shafts 72 and 73 are mounted on the upper longitudinal members of the framework 1, in the arrangement shown in Figure 1. The shafts 58 of the upper rollers 3 and 4 are driven from the shafts 71 and 70 respectively, while the shafts 58 of the lower rollers 3 and 4 are driven from the shafts 73 and 72 respectively, the driving of the shafts 58 being in all cases effected by means of chain and sprocket drives from the appropriate one of the shafts 70 to 73. In the case of the forward pair of rollers 3, the chain and sprocket drives to their shafts 58 provide for a faster speed of rotation of their said shafts than of the shafts 58 of the other rollers, so as to enable logs to be fed continuously through the cutting head despite any slight delay between the introduction of successive logs into the machine.

As a log 67 is moved by the rollers 3 towards the bore of the cutting head 2, following the introduction of the log into the machine, it bears upon the adjacent free ends of the cutter arms 10 and moves these ends apart against the influence of the tension spring 50 which, after the log 67 has thus entered between the ends of the cutter arms, maintains the rotating cutters 11 against the log on opposite sides of the log, so that the bark is cut from the log by the rotating planing knives 28 as the log moves between the cutter arms 10 and through the bore 9a, 5a of the head 2, and as the cutter arms and their cutters revolve with the head about the log 67.

During the cutting of the bark from the log, the depth of the cut is limited to only slightly more than the thickness of the bark by means of the free-riding colters, which, under the pressure normally applied by the spring 50, cut through the relatively soft bark, but penetrate only shallowly into the harder wood of the log, so that the depth of the cut is governed by the thickness of bark on the log, the tension of the spring 50 having been initially set by adjustment of the tension-regulating lever 49 to provide the required penetration of the colters into the wood of the log in accordance with the hardness of the log. As well as regulating the depth of the cut in the manner just described, the colters also facilitate the removal of the bark by cutting through the bark at one side of the helical track followed by the knives of each cutter 11 during the revolution of the cutting head 2 about the forwardly moving log.

The limited universal mounting of the cutter arms 10 on their supporting housings 12 enables the cutter arms to find their own operating angle in relation to logs of different diameters, so that the axis of rotation of each cutter 11 always lies at right angles across the line of the track cut by the revolving knives 28 of the cutter. At the same time the cutters 11 are enabled to rest squarely on the log, with both the colter 35 and the blunt-edged disc 37 of each cutter in contact with the log. The speed of rotation of the head 2 is such in relation to the forward movement of the log through the head that the width of bark removed at each revolution of the head is less than the width of the blades, so that the discs 37 always run on the portion of the log from which the bark has been removed. As the discs 37 are of the same diameter as the colters 35, the cutting edges 28a of the knives 28 are thus kept substantially parallel to the surface of the log to provide an even depth of cut across the width of the track cut by the knives.

The universal mounting of the cutter arms 10 on the housings 12 also enables the cutter arms to adjust themselves to distortions or superficial irregularities in the log, while if for any reason the log should jam in the machine, or the machine should stop with the cutters 11 still in engagement with the log, the cutters can be freed from the log by moving the tension-regulating lever 49 to release all tension of the spring 50 on the cable 47, so that the free ends of the cutter arms 10 are moved clear of the log under the influence of the torsion springs 46. The pressure of the cutters 11 on the log can be similarly released just before the log has been completely barked and before the colters 35 run off the end of the log, so as to avoid the bevelling of the rear end portion of the log which results from the consequent tilting of the rotational axis of the cutters in relation to the surface of the log.

The machine which has been described above enables the rapid and even removal of bark from logs of various diameters, despite the presence of a certain amount of deformity or superficial irregularity in the logs, and without normally requiring manual adjustment of the machine during the barking operation. Logs are automatically centred in relation to the cutting head 2 in the course of their passage through the machine, and wastage caused by the trimming of an excessive amount of wood from the logs is avoided by means of the colters 35 which govern the depth of the cut in accordance with the actual thickness of the bark which is being removed at any instant of the machine's operation, and additionally by means of the pressure-regulating means operated by the lever 49 in accordance with the hardness of the logs.

The machine is capable of modification in several respects from the construction described above. In particular, the required pressure of the cutters 11 on the logs passing through the machine may be provided by a pair of tension coil springs in tension between the cutter arms and a pair of brackets or lugs secured to the annular plate 9 of the cutting head in opposed positions thereon, each bracket having attached to it an arcuately slotted member in which is slidably engaged the shank of a bolt extending between the side plates of the adjacent cutter arm at the free end of that arm, so that the pivotal movement of the arms 10 on their supporting housings 12 is limited to an extent which prevents the cutters 11 from coming into contact. In this modification, the spindles 39 and their associated linkage, pulleys, springs and cable are eliminated.

In another modification, the driving of the cutters 11 is effected by independent small electric slip-ring motors replacing the drive through the drive shafts 19 and their associated universal joints 23, 24. The electric motors may be mounted either within the ends of the cutter arms 10 which are mounted on the housings 12, in which case they are connected by a chain and sprocket drive, equivalent to the drive 34, to the cutter shafts 30, or they may be mounted at the free ends of the cutter arms 10 to form in effect the cutters 11, the planing knives 28 being secured directly on an external rotating member of the motor.

What I do claim and desire to secure by Letters Patent of the United States of America is:

A log-barking machine having a rotatable cutting head through which a log can be moved; feed means operable to move and guide a log through the head; a framework supporting the head and the feed means; cutting means which form a part of the cutting head and which are operable to cut and remove the bark from a log while the log is moved through the head, the cutting means bearing resiliently and continuously against the log during the cutting of the bark from the log; and depth regulating means operatively associated with the cutting means to govern the depth of the cut made by the cutting means in accordance with the thickness of bark on the log, the cutting means consisting of a pair of rotatable cutters, a pair of cutter arms carrying said cutters and universally mounted on the cutting head, and a spring biasing said arms so that the cutters bear resiliently and continuously against the log from opposite sides of the log during the cutting of the bark from the log.

References Cited in the file of this patent

UNITED STATES PATENTS

| | | |
|---|---|---|
| 2,646,092 | Kolpe et al. | July 21, 1953 |
| 2,774,397 | Leffler | Dec. 18, 1956 |
| 2,779,363 | Laughton | Jan. 29, 1957 |
| 2,843,168 | Lunn | July 15, 1958 |